United States Patent
Neuhaeuser

(10) Patent No.: US 12,273,960 B2
(45) Date of Patent: *Apr. 8, 2025

(54) METHOD AND SYSTEM FOR PROVIDING A COMMUNICATION FUNCTION IN A MEANS OF TRANSPORT

(71) Applicant: Bayerische Motoren Werke Aktiengesellschaft, Munich (DE)

(72) Inventor: Michael Neuhaeuser, Sankt Wolfgang (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 418 days.

This patent is subject to a terminal disclaimer.

(21) Appl. No.: 17/635,435

(22) PCT Filed: Jul. 30, 2020

(86) PCT No.: PCT/EP2020/071595
§ 371 (c)(1),
(2) Date: Feb. 15, 2022

(87) PCT Pub. No.: WO2021/058182
PCT Pub. Date: Apr. 1, 2021

(65) Prior Publication Data
US 2022/0337996 A1 Oct. 20, 2022

(30) Foreign Application Priority Data

Sep. 26, 2019 (DE) ................. 10 2019 125 959.2

(51) Int. Cl.
*H04W 68/00* (2009.01)
*H04W 4/20* (2018.01)
(Continued)

(52) U.S. Cl.
CPC ............. *H04W 8/205* (2013.01); *H04W 4/20* (2013.01); *H04W 4/40* (2018.02); *H04W 72/51* (2023.01)

(58) Field of Classification Search
CPC ......... H04W 8/205; H04W 4/20; H04W 4/40; H04W 72/51; H04W 4/48; G06Q 50/60; G06Q 10/10
(Continued)

(56) References Cited

U.S. PATENT DOCUMENTS 8,128,470 B2 * 3/2012 Chao Cheng ......... H04L 9/3226
463/6
8,787,966 B2 * 7/2014 Altman ................... H04W 8/18
370/328

(Continued)

FOREIGN PATENT DOCUMENTS

CN 106102111 A 11/2016
CN 109286925 A 1/2019
(Continued)

OTHER PUBLICATIONS

International Search Report (PCT/ISA/210) issued in PCT Application No. PCT/EP2020/071595 dated Aug. 28, 2020 with English translation (five (5) pages).
(Continued)

*Primary Examiner* — Amancio Gonzalez
(74) *Attorney, Agent, or Firm* — Crowell & Moring LLP

(57) ABSTRACT

A method for providing a communication function in a means of transport includes providing a code on the means of transport, wherein the code is capturable by a mobile terminal of a user and comprises unique identification information of a communication unit of the means of transport; reading the code provided on the means of transport; sending a request for activation of a communication capability of
(Continued)

the communication unit to the communication provider by way of the mobile terminal, wherein the request comprises the read unique identification information of the communication unit of the means of transport; and the communication provider providing the communication capability for the communication unit if the user is registered with the communication provider.

11 Claims, 2 Drawing Sheets

(51) Int. Cl.
  *H04W 4/40* (2018.01)
  *H04W 8/20* (2009.01)
  *H04W 72/51* (2023.01)
(58) Field of Classification Search
  USPC .......................................................... 455/558
  See application file for complete search history.

(56) References Cited

U.S. PATENT DOCUMENTS

| | | | | |
|---|---|---|---|---|
| 9,177,429 | B2* | 11/2015 | Lawrenson | B60R 16/037 |
| 9,369,921 | B2* | 6/2016 | Altman | H04W 28/0858 |
| 9,379,756 | B2* | 6/2016 | Altman | H04W 8/183 |
| 9,538,362 | B2* | 1/2017 | Allmann | H04W 12/08 |
| 9,648,492 | B2* | 5/2017 | Mallikarjunan | H04M 15/52 |
| 9,674,691 | B2* | 6/2017 | Lhamon | H04W 4/021 |
| 9,674,880 | B1* | 6/2017 | Egner | A61B 5/14542 |
| 9,736,688 | B2* | 8/2017 | Li | G08B 5/222 |
| 9,865,110 | B2* | 1/2018 | Link, II | H04W 12/35 |
| 9,980,171 | B2* | 5/2018 | Stein | H04W 12/06 |
| 10,002,476 | B1* | 6/2018 | Ekin | G07C 9/253 |
| 10,033,422 | B2* | 7/2018 | Wang | G06F 15/177 |
| 10,142,881 | B2* | 11/2018 | Link, II | H04W 36/0033 |
| 10,263,671 | B2* | 4/2019 | Kim | H04W 72/542 |
| 10,361,827 | B2* | 7/2019 | Sayana | H04B 7/0695 |
| 10,516,988 | B2* | 12/2019 | Fan | H04B 1/3816 |
| 10,582,412 | B2* | 3/2020 | Link, II | H04W 76/11 |
| 10,652,735 | B2* | 5/2020 | Li | G08B 5/222 |
| 10,674,350 | B2* | 6/2020 | Ahmed | H04W 8/205 |
| 10,735,944 | B2* | 8/2020 | Syed | H04L 67/1014 |
| 10,764,745 | B2* | 9/2020 | Li | H04W 12/06 |
| 10,873,439 | B2* | 12/2020 | Onggosanusi | H04B 7/0486 |
| 10,904,741 | B2* | 1/2021 | Chen | H04B 1/3816 |
| 10,951,382 | B2* | 3/2021 | Onggosanusi | H04W 72/21 |
| 11,039,299 | B2* | 6/2021 | Gui | H04W 4/50 |
| 11,076,283 | B2* | 7/2021 | Nori | H04M 1/72412 |
| 11,082,218 | B2* | 8/2021 | Nix | G06F 21/33 |
| 11,115,542 | B2* | 9/2021 | Hu | H04W 4/44 |
| 11,363,449 | B2* | 6/2022 | Goyal | H04W 12/35 |
| 11,546,822 | B2* | 1/2023 | Chau | H04L 1/18 |
| 11,568,353 | B2* | 1/2023 | Davis | G06Q 10/0833 |
| 11,569,966 | B2* | 1/2023 | Onggosanusi | H04W 72/21 |
| 11,627,456 | B2* | 4/2023 | Neuhaeuser | H04W 8/205 455/435.1 |
| 11,632,789 | B2* | 4/2023 | Soriaga | H04W 28/04 370/230 |
| 11,657,656 | B2* | 5/2023 | Sandu | H04W 4/70 701/36 |
| 11,709,666 | B2* | 7/2023 | Harata | G06F 8/65 717/172 |
| 11,718,249 | B2* | 8/2023 | Sandu | B60H 1/00364 701/2 |
| 11,770,705 | B2* | 9/2023 | Sandu | H04L 63/0853 455/411 |
| 11,812,258 | B2* | 11/2023 | Li | H04W 8/205 |
| 11,847,871 | B2* | 12/2023 | Garrett | G07C 5/0841 |
| 11,864,267 | B2* | 1/2024 | Chaugule | H04W 8/205 |
| 11,873,005 | B2* | 1/2024 | Altman | G01C 21/3889 |
| 11,934,823 | B2* | 3/2024 | Harata | G06F 21/572 |
| 2006/0149464 | A1* | 7/2006 | Chien | G01C 21/3492 340/995.19 |
| 2011/0136470 | A1* | 6/2011 | Kurz | H04W 12/06 455/410 |
| 2013/0277664 | A1 | 10/2013 | Etori | |
| 2014/0045459 | A1* | 2/2014 | Hjelm | H04L 63/0861 455/411 |
| 2015/0100398 | A1* | 4/2015 | Narayanaswami | G06Q 30/0236 705/14.1 |
| 2015/0111573 | A1 | 4/2015 | Barton et al. | |
| 2015/0200754 | A1* | 7/2015 | Sayana | H04L 5/0053 370/328 |
| 2015/0237497 | A1* | 8/2015 | Chen | H04W 8/183 455/558 |
| 2015/0249578 | A1 | 9/2015 | Bothe | |
| 2016/0012465 | A1* | 1/2016 | Sharp | G06Q 20/321 705/14.17 |
| 2016/0087957 | A1* | 3/2016 | Shah | H04L 63/205 726/1 |
| 2016/0098675 | A1* | 4/2016 | Carvalho | G06Q 10/087 705/28 |
| 2017/0011572 | A1* | 1/2017 | Link, II | H04W 12/06 |
| 2017/0103440 | A1* | 4/2017 | Xing | H04W 12/06 |
| 2017/0111752 | A1 | 4/2017 | Huang-Fu et al. | |
| 2017/0315797 | A1* | 11/2017 | Vangelov | H04L 67/12 |
| 2017/0332273 | A1 | 11/2017 | Link, II | |
| 2017/0347266 | A1 | 11/2017 | Petel | |
| 2018/0063698 | A1* | 3/2018 | Sonntag | H04L 67/303 |
| 2018/0242141 | A1* | 8/2018 | Wu | H04W 8/20 |
| 2018/0288560 | A1 | 10/2018 | Naik et al. | |
| 2019/0174299 | A1* | 6/2019 | Ullah | H04W 4/50 |
| 2019/0182013 | A1* | 6/2019 | Onggosanusi | H04B 7/0626 |
| 2019/0387396 | A1 | 12/2019 | Gui | |
| 2020/0007213 | A1* | 1/2020 | Kakishima | H04L 5/0057 |
| 2021/0075680 | A1* | 3/2021 | Younger | G01S 19/14 |

FOREIGN PATENT DOCUMENTS

| | | |
|---|---|---|
| EP | 2 913 989 A2 | 9/2015 |
| EP | 3 528 518 A1 | 8/2019 |
| JP | 2018-506208 A | 3/2018 |
| JP | 2018-530204 A | 10/2018 |
| WO | WO 2018/133271 A1 | 7/2018 |

OTHER PUBLICATIONS

German-language Written Opinion (PCT/ISA/237) issued in PCT Application No. PCT/EP2020/071595 dated Aug. 28, 2020 (seven (7) pages).

German-language Search Report issued in German Application No. 10 2019 125 959.2 dated Feb. 5, 2021 with partial English translation (11 pages).

Autosieger.De. "Volkswagen Touareg isl mit der eSIM digital 'always on'" Jul. 12, 2018 (Jul. 12, 2018), Retrieved from the Internet: https://web.archive.org/web/20180712130513/https://www.autosieger.de/volkswagen-touareg-ist-mit-der-esim-digital-always-on-article37370.html, XP055722763 (four (4) pages).

English translation of Japanese-language Office Action issued in Japanese Application No. 2022-509671 dated Jul. 17, 2024 (4 pages).

English translation of Chinese-language Office Action issued in Chinese Application No. 202080059565.0 dated Sep. 12, 2024 (9 pages).

\* cited by examiner

METHOD AND SYSTEM FOR PROVIDING A COMMUNICATION FUNCTION IN A MEANS OF TRANSPORT

BACKGROUND AND SUMMARY OF THE INVENTION

The present disclosure relates to a method and a system for providing a communication function in a means of transport and to a storage medium for carrying out the method. The present disclosure relates in particular to identification of a user to a communication provider for the purpose of providing a communication function in a means of transport, such as for example a vehicle.

The networking of modern vehicles is assuming steadily increasing importance. For example, a user can use a communication function implemented in a vehicle to access web content, make telephone calls or use other network-based services. In order to be able to use such services, the user can implement a communication function in the vehicle that is provided by a communication provider. This requires the user to identify himself to the communication provider. Such identification can be complicated for the user, however, and sometimes possible only with some expenditure of time.

It is an object of the present disclosure to implement a communication function in a means of transport, in particular a vehicle or a motor vehicle. In particular, it is an object of the present disclosure to load a communication function, for example based on an eSIM, into a means of transport efficiently and in a manner that is simplified for the user.

This object is achieved by the claimed invention.

According to one independent aspect of the present disclosure, a method for providing a communication function in a means of transport, such as for example a vehicle, is specified. The method comprises providing a code on the means of transport (e.g. visually or by way of NFC), wherein the code is scannable by a mobile terminal of a user and comprises unique identification information of a communication unit, such as e.g. a SIM unit of the means of transport; e.g. the mobile terminal reading the code provided on the means of transport; the mobile terminal transmitting a request for activation of a communication capability of the communication unit, e.g. through provision of an eSIM, to the communication provider, wherein the request comprises the read unique identification information of the communication unit of the means of transport; and the communication provider providing the communication capability, such as for example the eSIM, for the means of transport if the user is registered with, or known to, the communication provider as a communication subscriber.

The communication provider allows communication subscribers to communicate using a mobile network. In particular, the communication provider can be a network operator of the mobile network. The aspects of the method according to the invention that relate to the communication provider can be implemented by a central unit of the communication provider, such as for example a back end. In particular, the request from the mobile terminal can be transmitted to the communication provider, or the central unit of the communication provider, via the mobile network. Similarly, e.g. the eSIM can be transmitted to the means of transport via the mobile network directly, or the eSIM can be transmitted to the means of transport indirectly e.g. via the mobile terminal or a third unit, such as a back end of a manufacturer of the means of transport.

According to embodiments of the invention, a first apparatus, which, or the user of which, is already known to the communication provider, is used to identify a second apparatus. It is then possible e.g. for an eSIM to be loaded into the means of transport for the user and used for communication. It is therefore not necessary to provide an additional identification mechanism in order to allow unique identification of the user for the purpose of activating the communication function. In particular, use of the mobile terminal makes it possible to guarantee that the person wishing to load a profile is the same person who has actually requested the profile. It is thus possible e.g. for an eSIM to be loaded into a means of transport efficiently and in a manner that is simplified for the user.

The term mobile terminal covers smartphones in particular, but also other mobile telephones or cell phones, personal digital assistants (PDAs), tablet PCs, notebooks, smartwatches and all current and future electronic devices equipped with a technology for loading and executing apps.

The mobile terminal can for example be designed to communicate wirelessly in a mobile network, e.g. using wide area networks (WANs) such as e.g. Global System for Mobile Communication (GSM), General Package Radio Service (GPRS), Enhanced Data Rates for Global Evolution (EDGE), Universal Mobile Telecommunications System (UMTS), High Speed Downlink/Uplink Packet Access (HSDPA, HSUPA), Long-Term Evolution (LTE), or Worldwide Interoperability for Microwave Access (WIMAX). Communication using other current or future communication technologies, e.g. 5G mobile radio systems, is likewise possible.

The communication unit is preferably a SIM unit. The providing of the communication capability for the communication unit can comprise loading an eSIM into the SIM unit.

The communication unit, such as for example the SIM unit (also referred to as "Subscriber Identity Module"), can be installed in the means of transport. The communication unit can be designed for communication with the mobile terminal and/or the communication provider. By way of example, an eSIM can be loaded into the SIM unit, as a result of which the communication function using the mobile network is made possible.

The communication unit of the means of transport can be designed to use the mobile network to communicate with the communication provider, and in particular the central unit of the communication provider. Moreover, the communication unit of the means of transport can be designed, in some embodiments, to communicate with the mobile terminal of the user. The communication between the communication module of the means of transport and the mobile terminal can take place using one of the aforementioned mobile networks or a near field technology, such as for example Bluetooth.

By way of example, the communication unit of the means of transport can use the mobile network to communicate with the communication provider, e.g. in order to load the eSIM into the means of transport, or the SIM module of the means of transport. In other words, the eSIM can be transmitted to the means of transport via the mobile network. In another example, the communication unit of the means of transport is connected to the mobile terminal by way of NFC, wherein e.g. the eSIM can be transmitted from the communication provider to the means of transport via the mobile terminal. In yet another example, e.g. the eSIM can be transmitted from the communication provider to the vehicle via a third unit, such as for example a back end of a vehicle manufacturer.

Preferably, the identification information of the SIM unit of the vehicle, which information can be represented by way of the code, specifies an IMSI ("International Mobile Subscriber Identity") of the SIM unit. The IMSI is used to uniquely identify the network subscribers in mobile radio networks. The IMSI number is allocated by the mobile radio network operators once per SIM worldwide and therefore allows unique authentication of the vehicle containing the SIM unit.

The identification information is not limited to the aforementioned examples, however. By way of example, the communication unit can be a router with which applicable unique identification information is associated.

Preferably, the method further comprises the communication provider checking an identity of the user after receiving the request, wherein the communication capability (e.g. the eSIM) is provided for the means of transport only if the identity of the user is verified. In particular, the mobile terminal can be connected to the communication provider via the mobile network, as a result of which the mobile terminal and hence the user can be uniquely identified by the communication provider. If the identity of the user cannot be verified, the request for provision of the communication capability can be denied.

Preferably, a proof of identity of the user is stored with the communication provider when the user is registered. Within the context of the present disclosure, registration of the user with the communication provider means that the user has already been uniquely identified to the communication provider. The unique identification can have taken place as part of real name registration. Real name registration means that a communication subscriber is forced to reveal his true identity, and, for example in Germany, is prescribed by the telemedia act.

Preferably, the method further comprises scanning at least one biometric characteristic of the user, wherein the request further comprises data regarding the at least one biometric characteristic of the user. The at least one biometric characteristic scanned can be compared against identification data stored with the communication provider in order to verify the identity of the user. Scanning the at least one biometric characteristic of the user can increase a security of the process further. In particular, it is possible to guarantee that it is actually the registered and hence authorized user initiating the request for provision of the communication capability.

Preferably, the at least one biometric characteristic is selected from the group consisting of a voice feature, a fingerprint, an eye feature (e.g. scannable by way of an iris scan) and a facial feature (e.g. scannable by way of a facial scan).

Preferably, the at least one biometric characteristic of the user is scanned by the mobile terminal or the means of transport. By way of example, a camera of the mobile terminal or of the means of transport can be used to perform a facial scan. In another example, a fingerprint sensor of the mobile terminal or of the means of transport can be used to scan a fingerprint of the user.

Preferably, the code is a two-dimensional code or a three-dimensional code, such as for example a QR code. The QR (quick response) code consists of a square matrix of black and white squares that represent the coded data in binary. The data coded in the QR code comprise (or are) for example the SIM identification information of the SIM unit of the vehicle, such as for example the IMSI number.

Preferably, the code can be provided by the means of transport visually. In particular, the code can be provided visually in such a way that it is scannable using the mobile terminal of the user. Typically, the code is provided by way of a display apparatus installed in the means of transport, such as for example a display or a projection apparatus.

The display can be a display of an infotainment system, for example. Typically, the display is installed in or on the dashboard of the vehicle. The display can be a head unit, for example. The present disclosure is not limited thereto, however, and the display can be provided at other suitable locations in the means of transport. In some embodiments, the display is an LCD display, a plasma display or an OLED display.

The projection apparatus can be designed to provide the code on the means of transport so as to be visible from inside and/or outside, such as for example on a window of the vehicle. The window can be for example a windshield or a side window of the vehicle. Typically, the projection apparatus is a head-up display.

In another example, the code can be provided to the mobile terminal by way of near field communication (NFC, Bluetooth, etc.). In other words, the code is read via a communication connection and not visually.

Preferably, the code is provided only if the means of transport is supplied with power and/or the means of transport has been opened properly. If the means of transport has been opened properly and is therefore supplied with power, it can be assumed that the current user is authorized. It is thus possible to guarantee that the user using his mobile terminal to scan the code is doing so legally and is the authorized user. In this context, the term "opened properly" means that an unauthorized person has not entered the means of transport by force, for example by smashing a window. This allows misuse to be prevented.

Preferably, the mobile terminal's scanning or reading of the code provided on the means of transport comprises opening an app on the mobile terminal and reading the code by way of the app.

According to a further independent aspect of the present disclosure, a system for providing a communication function in a means of transport is specified. The system comprises an apparatus on the means of transport, designed to provide a code on the means of transport, wherein the code is scannable by a mobile terminal of a user and comprises unique identification information of a communication unit (e.g. a SIM unit) of the means of transport; and a central unit, designed to receive a request from the mobile terminal for activation of a communication capability for the communication unit (e.g. provision of an eSIM) for the means of transport, wherein the request comprises the unique identification information of the communication unit of the means of transport that is read by the mobile terminal, and wherein the central unit is designed to provide the communication capability (e.g. the eSIM) for the means of transport if the user is registered with the communication provider.

The system is in particular designed to carry out the method for providing a communication function in a means of transport that is described in this document.

According to a further aspect of the present disclosure, a storage medium containing a software program is provided. The software program is designed to be executed on one or more processors, and thereby to carry out the method for providing a communication function in a means of transport that is described in this document.

Within the context of the present disclosure, the term means of transport covers in particular vehicles, drones, ships, etc. Within the context of the present disclosure, the term vehicle covers in particular cars, trucks, buses, motor caravans, motorcycles, etc., that are used for transporting people, goods, etc. In particular, the term covers motor vehicles for transporting people.

Exemplary embodiments of the disclosure are shown in the figures and are described more thoroughly below.

DETAILED DESCRIPTION OF THE DRAWINGS

Unless stated otherwise, identical reference signs are used below for elements that are identical and have an identical effect.

Figure 1:
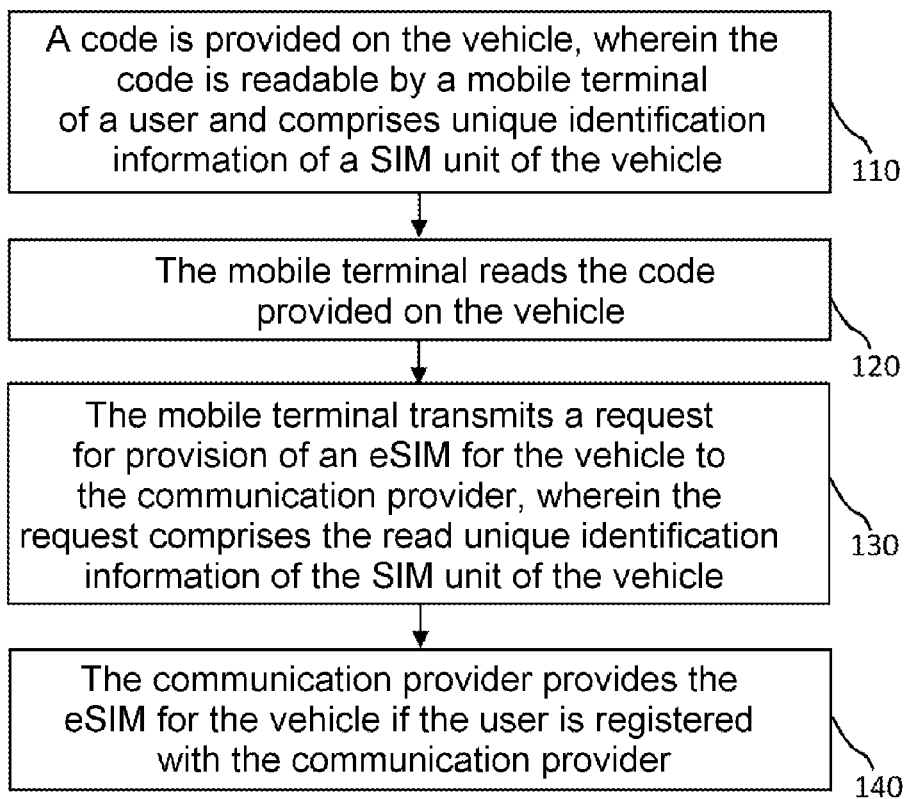
FIG. 1 schematically shows a flowchart for a method for providing a communication function in a means of transport according to embodiments of the present disclosure.

FIG. 1 schematically shows a flowchart for a method 100 for providing a communication function in a means of transport according to embodiments of the present disclosure.

The description that follows is provided by way of illustration with reference to a vehicle, a SIM unit and an eSIM. The present disclosure is not limited to these specific aspects, however.

The method 100 comprises, in block 110, providing a code on the vehicle (e.g. visually or by way of NFC), wherein the code is readable by a mobile terminal of a user and comprises unique identification information of a SIM unit of the vehicle; in block 120, the mobile terminal reading the code provided on the vehicle; in block 130, the mobile terminal transmitting a request for provision of an eSIM for the vehicle to the communication provider, wherein the request comprises the read unique identification information of the SIM unit of the vehicle; and in block 140, the communication provider providing the eSIM for the vehicle if the user is registered with, or known to, the communication provider as a communication subscriber.

In some embodiments, the code can be read using an app on the mobile terminal. The app can be an app of the communication provider or of a vehicle manufacturer. The app can in particular be designed to initiate the method for loading the eSIM into the vehicle.

Typically, the method 100 further comprises the communication provider checking an identity of the user after receiving the request, e.g. in a central unit of the communication provider, wherein the eSIM is provided for the vehicle only if the identity of the user is verified by the communication provider. In particular, the mobile terminal can be connected to the communication provider via the mobile network, as a result of which the mobile terminal and hence the user can be uniquely identified by the communication provider. If the identity of the user cannot be verified, the request for provision of the eSIM can be denied. In other words, an eSIM is not provided if the identity of the user cannot be verified.

In some embodiments, a proof of identity of the user is stored with the communication provider when the user is registered. The proof of identity can be obtained and stored by the communication provider as part of real name registration.

In some embodiments, the method 100 further comprises scanning at least one biometric characteristic of the user, wherein the request further comprises data regarding the at least one biometric characteristic of the user. The at least one biometric characteristic scanned can be compared against identification data stored with the communication provider in order to additionally verify the identity of the user. Scanning the at least one biometric characteristic of the user can increase a security of the process further. In particular, it is possible to guarantee that it is actually the registered and hence authorized user initiating the request for provision of the eSIM.

Typically, the at least one biometric characteristic is selected from the group comprising, or consisting of, a voice feature, a fingerprint, an eye feature (e.g. scannable by way of an iris scan) and a facial feature (e.g. scannable by way of a facial scan).

In some embodiments, the at least one biometric characteristic of the user is scanned by the mobile terminal or the vehicle. By way of example, a camera of the mobile terminal or of the vehicle can be used to perform a facial scan. In another example, a fingerprint sensor of the mobile terminal or of the vehicle can be used to scan a fingerprint of the user.

Figure 2:
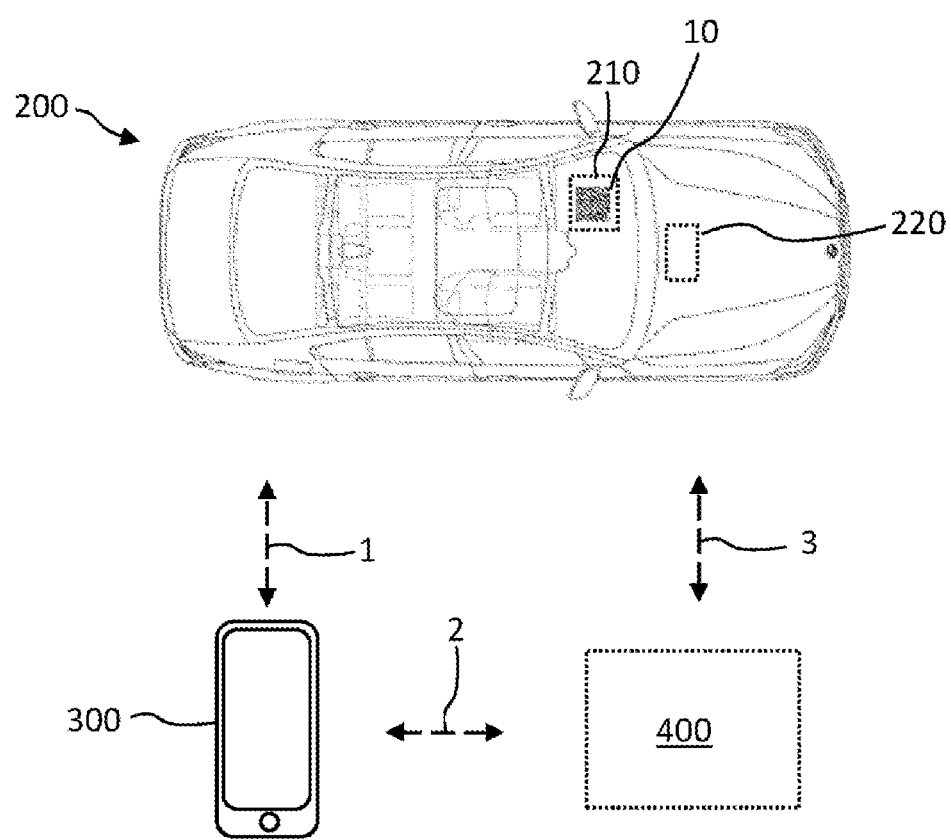
FIG. 2 schematically shows a system for providing a communication function in a means of transport according to embodiments of the present disclosure.

FIG. 2 schematically shows a system for providing a communication function in a vehicle 200 according to embodiments of the present disclosure.

By way of illustration, the vehicle 200, the mobile terminal 300 and a central unit 400 of the communication provider with which the user is registered and that provides the eSIM are shown.

The SIM unit 220 can be installed in the vehicle 200. In some embodiments, the vehicle 220 can comprise a communication unit containing the SIM unit. The communication unit can be designed for communication with the mobile terminal and/or the central unit 400 of the communication provider. The (digital) eSIM can be loaded into the SIM unit 220, which allows the vehicle to communicate using a mobile network.

In one illustrative embodiment, the mobile terminal 300 can use a first communication connection 1 to communicate with the vehicle 200 and can use a second communication connection 2 to communicate with the central unit 400. The vehicle 200 can use a third communication connection 3 to communicate with the central unit 400.

The first communication connection 1 between the mobile terminal 300 and the vehicle 200 is optional and can be made for example using a mobile network or a near field technology, such as for example Bluetooth or a local WiFi provided by the vehicle. The mobile network can be an LTE network or 5G network, for example. In some embodiments, the mobile terminal can read, or receive, the code via the first communication connection 1.

The second communication connection 2 between the mobile terminal 300 and the central unit 400 is made using a mobile network, such as for example an LTE network or 5G network. The second communication connection 2 is in particular used to transmit the request from the mobile terminal 300 to the central unit 400 of the communication provider. The mobile network of the second communication connection 2 can be operated by the communication provider, as a result of which it is possible for unique identification of the user, who already has his mobile terminal registered with the communication provider, to take place.

The third communication connection 3 between the vehicle 200 and the central unit 400 is optional and can be made using a mobile network, such as for example an LTE network or 5G network, using the SIM unit 220 that is present in the vehicle 200.

Some of the aforementioned communication connections between the vehicle 200, the mobile terminal 300 and the central unit 400 are not limited to the cited examples, however, and it is possible for other suitable types of direct or indirect communication connections to be used that allow direct or indirect communication between the vehicle 200, the mobile terminal 300 and the central unit 400. By way of example, a local area network, such as e.g. wireless LAN (WiFi/WLAN), can be used for the first communication connections 1.

The communication unit of the vehicle 200 can be designed to use the aforementioned mobile network (i.e. the third communication connection 3) to communicate with the communication provider, and in particular the central unit 400 of the communication provider. By way of example, the communication unit of the vehicle 200 can use the mobile network to communicate with the communication provider in order to load the eSIM in the vehicle 200.

In another example, the communication unit of the vehicle 200 is connected to the mobile terminal 300 by way of NFC (i.e. the first communication connection 1), wherein the eSIM can be transmitted from the communication provider to the vehicle 200 via the mobile terminal 300.

In yet another example, the eSIM can be transmitted from the communication provider to the vehicle 200 via a third unit (not shown), such as for example a back end of a vehicle manufacturer.

The vehicle 200 comprises a display apparatus 210, such as for example a display of an infotainment system. Typically, the display is installed in or on the dashboard of the vehicle 200. The display can be a head unit, for example. In some embodiments, the display is an LCD display, a plasma display or an OLED display.

The display apparatus 210 is designed to display the code 10 graphically, for example. The code 10 can be a two-dimensional or three-dimensional graphical code, such as for example a QR code. The code 10 is designed to be scanned or read by way of a camera of the mobile terminal 300, for example. In another example, the code can be provided to the mobile terminal 300 by way of near field communication (NFC, Bluetooth, etc.). In other words, the code is read e.g. via the first communication connection 1 and not visually.

Optionally, the additional aspects that follow can be implemented. First, the communication provider (MNO) can transmit a further code to the vehicle. This can be done via a back end of the vehicle manufacturer, for example. Secondly, the user can scan the identification information, or SIM information, in the vehicle, and, as evidence that he is now really performing the action in the vehicle (and does not have a photograph of the code), the user can additionally scan the second code of the communication provider (which can change, meaning that a photograph would be pointless).

The code 10 comprises unique identification information of the SIM unit 220 of the vehicle 200. In particular, the unique identification information can comprise or be an IMSI ("International Mobile Subscriber Identity") number of the SIM unit 220.

The user can use the mobile terminal 300 to read the displayed code 10. By way of example, the user can launch an app on the mobile terminal 200 and read the code 10 by way of the app.

The mobile terminal 300 can use the second communication connection 2 to transmit the request for provision of the eSIM for the vehicle 200 to the central unit 400. The request comprises the unique identification information of the SIM unit 220 of the vehicle 200 that was read by the mobile terminal 300. Optionally, the request comprises data regarding the at least one biometric characteristic of the user. The at least one biometric characteristic can be a fingerprint of the user, for example.

The communication provider checks an identity of the user on the basis of registration, or identification, of the user with/to the communication provider that has taken place earlier. If the check has a positive outcome, the eSIM can be conveyed to the vehicle 200, for example directly via the third communication connection 3 or indirectly via the mobile terminal 300 (i.e. the second communication connection 2 and then the first communication connection 1).

In some nonlimiting embodiments, the code 10 is provided only if the vehicle 200 is supplied with power and/or if the vehicle 200 has been opened properly. If the vehicle 200 has been opened properly and is therefore supplied with power, it can be assumed that the current user is authorized. It is thus possible to guarantee that the user using his mobile terminal 300 to scan the code 10 is doing so legally and is the authorized user (this is guaranteed by the use of a vehicle key, for example). In this context, the term "opened properly" means that an unauthorized person has not entered the vehicle 200 by force, for example by smashing a window.

According to embodiments of the invention, the above example involves a first apparatus, which, or the user of which, is already known to the communication provider, being used to identify a second apparatus, which e.g. is unknown to the communication provider. It is then possible for an eSIM to be loaded into the vehicle for the user and used for communication. It is therefore not necessary to provide an additional identification mechanism in order to allow unique identification of the user for the purpose of providing the eSIM in the vehicle. It is thus possible for an eSIM to be loaded into a vehicle efficiently and in a manner that is simplified for the user.

What is claimed is:

1. A method for providing a communication function in a means of transport, the method comprising:
    providing a code on the means of transport, wherein the code is scannable by a mobile terminal of a user and comprises unique identification information of a communication unit of the means of transport;
    reading the code provided on the means of transport;
    transmitting, by the mobile terminal, a request for activation of a communication capability of the communication unit to a communication provider, wherein the request comprises the unique identification information of the communication unit of the means of transport; and
    subsequently providing, by the communication provider, the communication capability for the communication unit upon determining that the user is registered with the communication provider,
    wherein the communication unit is a SIM unit, and
    wherein the providing of the communication capability for the communication unit comprises loading an eSIM into the SIM unit.

2. The method according to claim 1, further comprising:
    checking, by the communication provider, an identity of the user after receiving the request, wherein the communication capability is provided only if the identity of the user is verified.

3. The method according to claim 1, wherein a proof of the identity of the user is stored with the communication provider.

4. The method according to claim 1, further comprising:
scanning at least one biometric characteristic of the user, wherein the request further comprises data regarding the at least one biometric characteristic of the user.

5. The method according to claim 4, wherein the at least one biometric characteristic of the user is scanned by the mobile terminal or the means of transport.

6. The method according to claim 1, wherein the code provided on the means of transport is read by the mobile terminal by:
opening an app on the mobile terminal; and
reading the code by way of the app.

7. The method according to claim 6, wherein the code is read visually or by way of a near field communication connection.

8. The method according to claim 1, wherein the code is a visual code, a two-dimensional code or a three-dimensional code.

9. The method according to claim 8, wherein the code is a QR code.

10. The method according to claim 1, wherein the code is provided by the means of transport visually by way of a display or a projection apparatus, or wherein the code is provided by the means of transport by way of near field communication.

11. A system for providing a communication function in a means of transport, the system comprising:
an apparatus on the means of transport, wherein the apparatus is configured to provide a code on the means of transport, wherein the code is scannable by a mobile terminal of a user and comprises unique identification information of a communication unit of the means of transport; and
a central unit configured to receive a request from the mobile terminal for activation of a communication capability of the communication unit, wherein the request comprises the unique identification information of the communication unit of the means of transport that was scanned by the mobile terminal, and wherein the central unit is configured to subsequently provide the communication capability for the communication unit upon determining that the user is registered with the communication provider,
wherein the communication unit is a SIM unit, and
wherein the providing of the communication capability for the communication unit comprises loading an eSIM into the SIM unit.

* * * * *